(12) United States Patent
Gadarowski et al.

(10) Patent No.: US 7,120,161 B1
(45) Date of Patent: Oct. 10, 2006

(54) NETWORK ADAPTER AND METHOD OF USING SAME

(75) Inventors: Michael S. Gadarowski, Worcester, MA (US); Steven Touch, Attleboro, MA (US); Thomas Linnell, Northboro, MA (US)

(73) Assignee: EMC Corporation, Hopkinton, MA (US)

( * ) Notice: Subject to any disclaimer, the term of this patent is extended or adjusted under 35 U.S.C. 154(b) by 886 days.

(21) Appl. No.: 10/020,146

(22) Filed: Dec. 14, 2001

(51) Int. Cl.
*H04L 12/28* (2006.01)
*H04L 12/56* (2006.01)
*G06F 3/00* (2006.01)

(52) U.S. Cl. .......................................... 370/419; 710/1
(58) Field of Classification Search ................ 370/389, 370/419; 700/1, 8, 15, 100; 709/220–222; 710/1, 8, 15, 100
See application file for complete search history.

(56) References Cited

U.S. PATENT DOCUMENTS 6,202,111 B1 * 3/2001 Wallach et al. ............. 710/302
6,823,397 B1 * 11/2004 Rawson, III ................ 709/250

\* cited by examiner

*Primary Examiner*—Kevin C. Harper
(74) *Attorney, Agent, or Firm*—Krishnendu Gupta; Scott A. Ouellette

(57) ABSTRACT

In one embodiment of the present invention, a network adapter is provided that may be used in a network data storage system to permit data exchange among data exchanging devices and a data storage system input/output (I/O) controller. The network adapter may include a control interface and a control logic section. The control interface may be coupled to the controller. The control logic section may receive from the controller, via the control interface, a command, and may transmit to the controller, via the control interface, information concerning the operation of the network adapter. The control logic section may access, based upon the command from the controller, memory that may contain the information and an executable command to be supplied to other logic in the network adapter. The control interface may be identical to control interfaces in other (i.e., different) types of adapters that may be controlled by the controller.

18 Claims, 7 Drawing Sheets

NETWORK ADAPTER AND METHOD OF USING SAME

FIELD OF THE INVENTION

The present invention relates to a network adapter (and a method of using same) that may be used in a network data storage system to facilitate communication among the network data storage system and external data exchanging devices (e.g., host computer nodes).

BACKGROUND OF THE INVENTION

Network computer systems generally include a plurality of geographically separated or distributed computer nodes that are configured to communicate with each other via, and are interconnected by, one or more network communications media. One conventional type of network computer system includes a network data storage subsystem that is configured to provide a centralized location in the network at which to store, and from which to retrieve data. Advantageously, by using such a storage subsystem in the network, many of the network's data storage management and control functions may be centralized at the subsystem, instead of being distributed among the network nodes.

One type of conventional network data storage subsystem, manufactured and sold by the Assignee of the subject application (hereinafter "Assignee") under the tradename Symmetrix™ (hereinafter "the Assignee's conventional storage system"), includes a plurality of disk mass storage devices configured as one or more redundant arrays of independent (or inexpensive) disks (RAID). The disk devices are controlled by disk I/O controllers (commonly referred to as "back end" directors) that are coupled to a shared cache memory resource in the subsystem. The cache memory resource is also coupled to a plurality of host I/O controllers (commonly referred to as "front end" directors). The disk controllers are associated with and coupled to respective disk adapters that, among other things, interface the disk controllers to bus systems (e.g., small computer system interface (SCSI) based bus systems) used to couple the disk devices to the disk controllers. Similarly, the host controllers are associated with and coupled to respective host channel/network adapters that, among other things, interface the host controllers via channel input/output (I/O) ports to the network communications channels (e.g., Gigabit Ethernet, SCSI, Enterprise Systems Connection (ESCON), or Fibre Channel (FC) based communications channels) that couple the storage subsystem to computer nodes in the computer network external to the subsystem (commonly termed "host" computer nodes or "hosts"). Each respective host controller may control and monitor the operations of the respective network adapter to which the respective host controller is coupled. In order to facilitate this, each respective network adapter includes a respective control interface via which the respective network adapter's associated host controller may issue commands to the respective network adapter, and from which the controller may receive information from the adapter concerning the operational status of the adapter.

The Assignee's conventional storage system may include a plurality of differently configured network adapters that may facilitate communication among respective host controllers and respective sets of host nodes using respective subsets of communication channels. For example, if the data storage network comprises FC communication channels, the Assignee's conventional storage system may include at least a first type of network adapter and a second, different type of network adapter. The first type of network adapter may have a hardware and/or software/firmware configuration that may permit the first type of adapter to facilitate communication among its associated host controller and a set of associated host nodes, via a first predetermined number of FC communication channels. The second type of network adapter may have a different hardware and/or software configuration (i.e., different from that of the first type of network adapter) that may permit the second type of adapter to facilitate communication among its associated host controller and a different set of associated host nodes via a second predetermined number of FC communication channels that may be different from the first predetermined number.

In the Assignee's conventional storage system, the control interfaces that are used in mutually dissimilar types of network adapters typically also are mutually dissimilar. Unfortunately, this has meant that unless a host controller has been specifically designed to use the particular control interface in a specific type of network adapter, that controller may be incompatible with (i.e., be unable to use) that control interface. Disadvantageously, this inherently limits the ability of respective host controllers to control and monitor the operation of different types of network adapters, and increases the amount of design effort required to ensure host controller-network adapter compatibility. It would be desirable to increase the ability of respective host controllers to control and monitor different types of network adapters, and decrease the amount of design effort required to ensure host controller-network adapter compatibility, by providing in the different types of network adapters respective "standardized" control interfaces (i.e., control interfaces that have identical respective constructions and operations).

SUMMARY OF THE INVENTION

In accordance with the present invention, a network adapter and method of using same are provided that overcome the aforesaid and other disadvantages and drawbacks of the prior art. In one embodiment of the present invention, the network adapter may be used in a network data storage system to permit and/or facilitate data exchange among external data exchanging devices (e.g., host nodes) and a data storage system I/O controller (e.g., a host director/controller) that resides in the data storage system.

The network adapter of this embodiment may include at least one control interface and at least one control logic section associated with the at least one control interface. The control interface may be coupled to the controller. The logic section may receive from the controller (when the network adapter and the controller are coupled together), via the control interface, at least one command. The logic section may also transmit to the controller (when the network adapter and the controller are coupled together), via the control interface, information concerning the operation of the network adapter. The logic section may be configured to access, based upon the command received from the controller, computer-readable memory that may store both the information and an executable command to be supplied to other (e.g., additional) logic, external to the interface and the control logic, in the network adapter, for execution.

The information that may be transmitted to the controller from the adapter concerning the operation of the adapter may indicate one or more of the following: the respective configuration of the adapter, the number of I/O ports comprised in the adapter, the version of program code executed by the control logic section, the speed of communication to/from the host nodes that may be supported by the adapter, and an operational status of the adapter (e.g., involving whether a signal from one of the data exchanging devices is being received at one or more of the adapter's I/O ports).

When executed, the executable command stored in the memory may prevent the adapter from supplying an interrupt signal to the controller in response to at least one type of event that may occur. Alternatively, when executed, the executable command may cause one or more of the adapter's components to be reset, activated, or de-activated; these one or more components may comprise one or more I/O ports in the adapter. Further alternatively, when executed, the executable command may cause the network adapter's configuration to be changed.

The network data storage system may include an electrical backplane. The network adapter of this embodiment of the present invention may be embodied as a respective electrical circuit card that may be configured to be inserted into and received by a respective circuit card slot in the backplane. When the circuit card embodying the adapter is inserted into and received by the slot, the adapter may be electrically and mechanically coupled to the backplane such that the at least one control interface may be electrically coupled to the backplane. The controller also may be embodied as a respective electrical circuit card that may be configured to be inserted into and received by a respective circuit card slot in the backplane. When the circuit card embodying the controller is inserted into and received by the slot, the controller may be electrically and mechanically coupled to the backplane. When both the adapter and the controller are so coupled to the backplane, the adapter and the controller may be coupled together via the backplane. The backplane may be configured such that when the adapter and the controller are coupled together via the backplane, the backplane may permit communication (i.e., exchange of data and commands) between the controller and the adapter.

The data storage system may comprise a set of mass storage devices (e.g., disk drive devices) that may exchange data with the data exchanging devices via the adapter. The at least one control interface may include an asynchronous transmission interface via which the at least one command may be transmitted to the adapter from the controller as a serial bit stream when the adapter is coupled to the controller.

The network adapter of this embodiment of the present invention may be classified as one type of network adapter, selected from a group of different types of network adapters that, when coupled to the controller, may be able to communicate with the controller (e.g., so as to permit the controller to be able to control and monitor the operation of the network adapter of this embodiment of the present invention). Each of the different types of network adapters in this group may have a different respective configuration that may facilitate communication with a respective set of host nodes via respective numbers and/or types of communication channels, and may comprise at least one respective control interface that may be identical in operation and construction to the at least one control interface that is included in the network adapter of this embodiment of the present invention.

In summary, in contradistinction to the prior art, in the present invention, different types of network adapters (i.e., network adapters having different respective hardware and/or software configurations) may comprise one or more respective standardized control interfaces that may be used by host controllers to control and monitor the operation of the adapters. Advantageously, this permits, in the present invention, the ability of respective host controllers to control and monitor the operation of different types of network adapters to be enhanced, and also permits the amount of design effort required to ensure host controller-network adapter compatibility to be decreased, compared to the prior art.

These and other features and advantages of the present invention will become apparent as the following Detailed Description proceeds and upon reference to the Figures of the Drawings, in which like numerals depict like parts, and wherein:

Although the following Detailed Description will proceed with reference being made to illustrative embodiments and methods of use of the present invention, it should be understood that it is not intended that the present invention be limited to these illustrative embodiments and methods of use. On contrary, many alternatives, modifications, and equivalents of these illustrative embodiments and methods of use will be apparent to those skilled in the art. Accordingly, the present invention should be viewed broadly as encompassing all such alternatives, modifications, and equivalents as will be apparent to those skilled in art, and should be viewed as being defined only as forth in the hereinafter appended claims.

DETAILED DESCRIPTION OF ILLUSTRATIVE EMBODIMENTS

Figure 1:
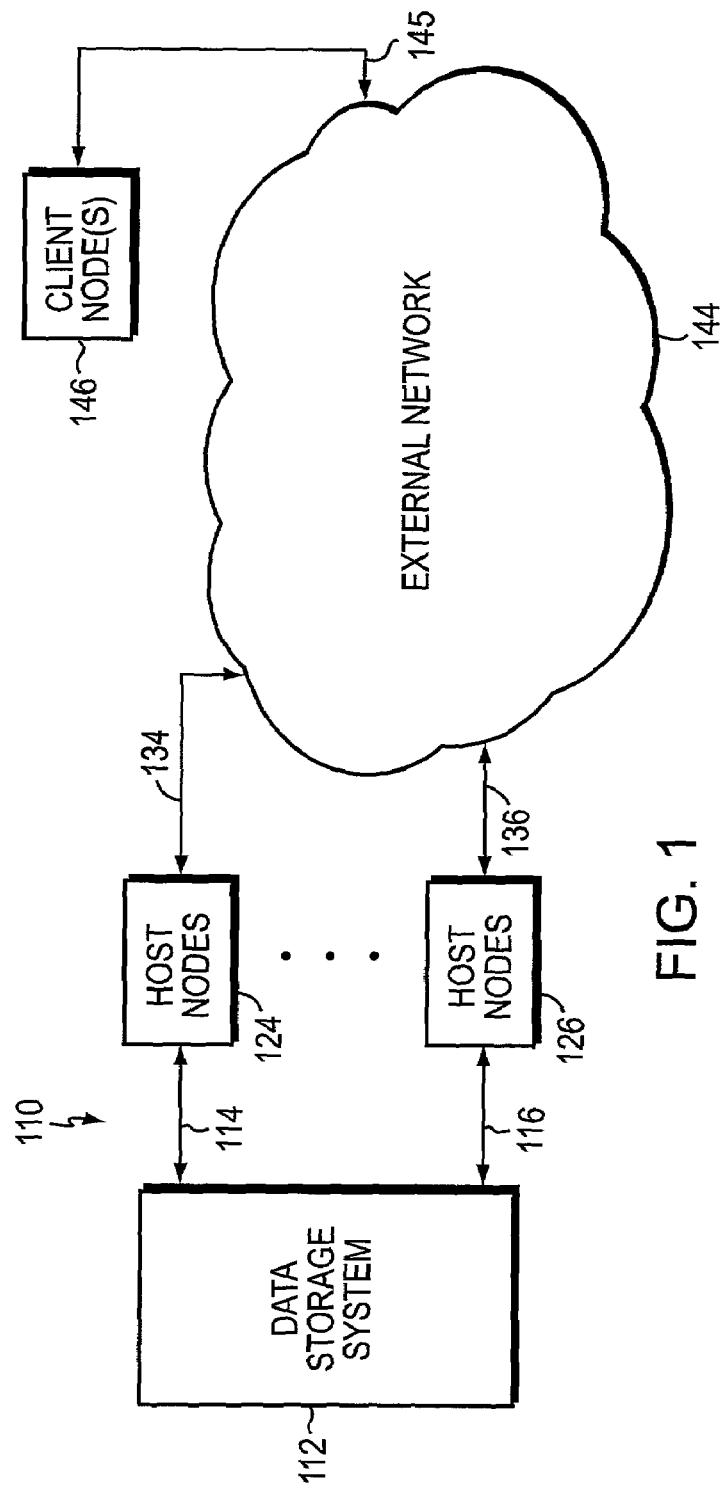
FIG. 1 is a high-level functional schematic block diagram of a data storage network that includes a network data storage system having network adapters made according to one embodiment of the present invention.

Turning now to the Figures of the drawings, illustrative embodiments of the present invention will be described. FIG. 1 is a high-level block diagram illustrating a data storage network 110 that includes a data storage system 112 that is coupled via respective sets 114 . . . 116 of communication channels to respective sets 124 . . . 126 of host computer nodes. Host nodes 124 . . . 126 are also coupled via additional respective conventional network communication links (collectively referred to by numerals 134 . . . 136) to an external network 144. Network 144 may comprise one or more Transmission Control Protocol/Internet Protocol (TCP/IP)-based and/or Ethernet-based local area and/or wide area networks. Network 144 is also coupled to one or more client computer nodes (collectively or singly referred to by numeral 146 in FIG. 1) via network communication links (collectively referred to by numeral 145 in FIG. 1). The network communication protocol or protocols utilized by the links 134 . . . 136 and 145 are selected so as to ensure that the nodes 124 . . . 126 may exchange data and commands with the nodes 146 via network 144.

Host nodes may be any one of several well-known types of computer nodes, such as server computers, workstations, or mainframes. Alternatively, or in addition thereto, some or all of the host nodes may be or comprise intermediate network computer stations, such as routers, switches, bridges, etc. In general, each of the host nodes 124 . . . 126 and client nodes 146 comprises a respective computer-readable memory (not shown) for storing software programs and data structures associated with, and for carrying out the functions and operations described herein as being carried by these nodes 124 . . . 126 and 146. In addition, each of the nodes 124 . . . 126 and 146 further includes one or more respective processors (not shown) and network communication devices for executing these software programs, manipulating these data structures, and for permitting and facilitating exchange of data and commands among the host nodes 124 . . . 126 and client nodes 146 via the communication links 134 . . . 136, network 144, and links 145. The execution of the software programs by the processors and network communication devices included in the hosts 124 . . . 126 also permits and facilitates exchange of data and commands among the nodes 124 . . . 126 and the system 112 via the communication channels 114 . . . 116, in the manner that will be described below.

Figure 2:
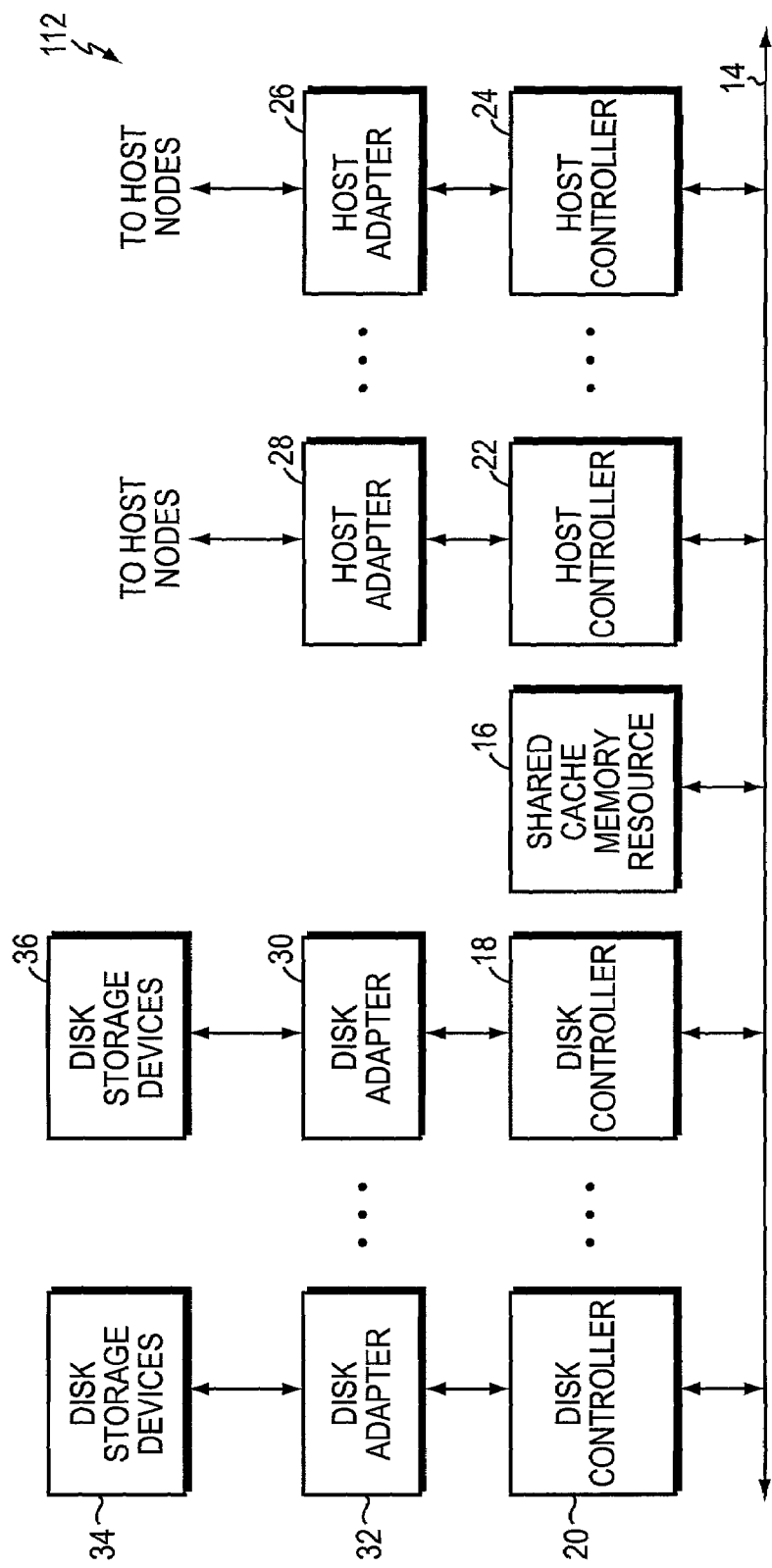
FIG. 2 is a high-level functional schematic block diagram illustrating functional components of the network data storage system included in the data storage network shown in FIG. 1.

FIG. 2 is a high-level schematic block diagram of functional components of the system 112. System 112 may include a bus system 14 that electrically couples together a plurality of host controllers 22 . . . 24, a plurality of disk controllers 18 . . . 20, and a shared cache memory resource 16. Bus system 14 may include a plurality of redundant busses (not shown) and bus arbitration, termination, and control systems (also not shown).

Figure 3:
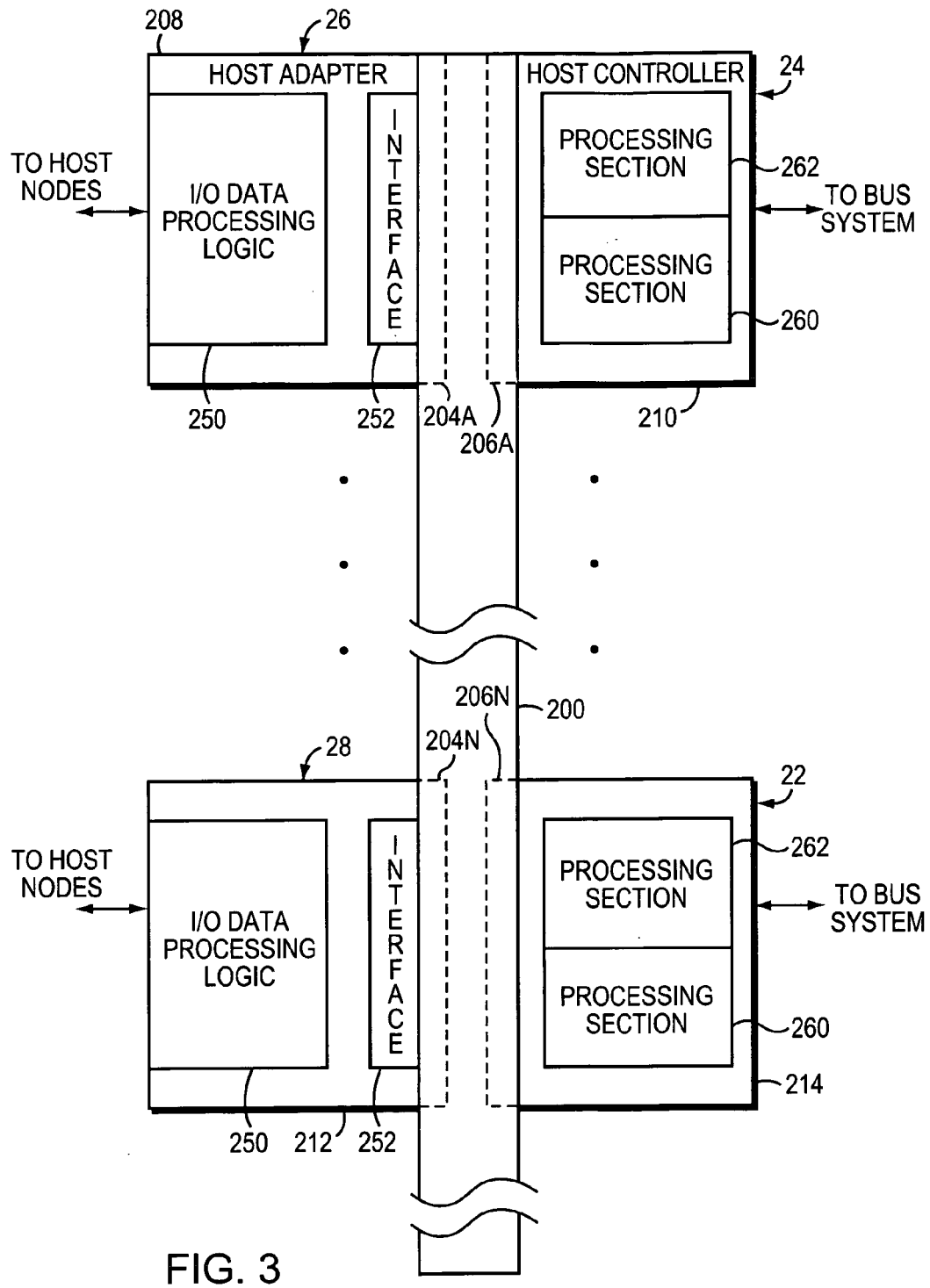
FIG. 3 is high-level schematic block diagram illustrating the manner in which the network adapters made according to one embodiment of the present invention may be coupled to an electrical backplane in the network data storage system illustrated in FIG. 2.

Each host controller 22 . . . 24 may comprise a single respective electrical circuit card or panel. For example, as is shown in FIG. 3, the controllers 22, 24 may each comprise a single respective electrical circuit card or panel 214, 210. Likewise, each disk controller 18 . . . 20 may comprise a single respective electrical circuit card or panel. Each disk adapter 30 . . . 32 may comprise a single respective electrical circuit card or panel. Likewise, each host adapter 26 . . . 28 may comprise a single respective electrical circuit card or panel. For example, as is shown in FIG. 3, the host adapters 26, 28 may each comprise a single respective electrical circuit card or panel 208, 212. Each host controller may be electrically and mechanically coupled to a respective host adapter via a respective mating electromechanical coupling system, which system is described more fully below.

In this embodiment of system 112, although not shown explicitly in the Figures, each host adapter 26 . . . 28 may be coupled to a respective set of host nodes via a respective set of communication channels. For example, adapter 26 may be coupled via eight respective FC links (collectively referred to by numeral 114) to eight respective host nodes (collectively referred to by numeral 124), and adapter 28 may be coupled via four respective FC links (collectively referred to by numeral 116) to four respective host nodes (collectively referred to by numeral 126). It should be appreciated that the number of host nodes to which each host adapter 26 . . . 28 may be coupled may vary, depending upon the particular configurations of the host adapters 26 . . . 28.

Disk adapter 32 is electrically coupled to a set of mass storage devices 34, and interfaces the disk controller 20 to those devices 34 so as to permit exchange of data and commands between processing sections (not shown) in the disk controller 20 and the storage devices 34. Disk adapter 30 is electrically coupled to a set of mass storage devices 36, and interfaces the disk controller 18 to those devices 36 so as to permit exchange of data and commands between processing sections (not shown) in the disk controller 18 and the storage devices 36. The devices 34, 36 may be configured as redundant arrays of conventional disk mass storage devices.

It should be appreciated that the respective numbers of the respective functional components of system 112 shown in FIG. 2 are merely for illustrative purposes, and depending upon the particular application to which the system 112 is intended to be put, may vary without departing from the present invention. For example, it may be desirable to permit the system 112 to be capable of fail-over fault tolerance in the event of failure of a particular component in the system 112. Thus, in practical implementation of the system 112, it may be desirable for system 112 to include redundant functional components and mechanisms for ensuring that the failure of any given functional component is detected and the operations of any failed functional component are assumed by a respective redundant functional component of the same type as the failed component.

The general manner in which data may be retrieved from, and stored in the system 112 will now be described. Broadly speaking, in operation of system 110, a client node 146 may forward a request to retrieve data to a host node (e.g., one of the host nodes comprised in host nodes 124, hereinafter termed "the retrieving host node") via one of the links 145 associated with the client node 146, network 144, and one of the links 134 associated with the retrieving host node. If data being requested is not stored locally at the retrieving host node, but instead, is stored in the data storage system 112, the retrieving host node 124 may request the forwarding of that data from the system 112 via a respective one of the FC links 114 with which the retrieving host node is associated, and to which the retrieving host node is coupled.

The request forwarded via the retrieving host node is initially received by the host adapter 26. The host adapter 26 may then forward the request to the host controller 24 to which it is coupled. In response to the request forwarded to it, the host controller 24 may then ascertain from data storage management tables (not shown) stored in the cache 16 whether the data being requested is currently in the cache 16; if the requested data is currently not in the cache 16, the host controller 24 may request that the disk controller (e.g., controller 18) associated with the storage devices 36 within which the requested data is stored retrieve the requested data into the cache 16. In response to the request from the host controller 24, the disk controller 18 may forward via the disk adapter 30 to which it is coupled appropriate commands for causing one or more of the disk devices 36 to retrieve the requested data. In response to such commands, the devices 36 may forward the requested data to the disk controller 18 via the disk adapter 30. The disk controller 18 may then store the requested data in the cache 16.

When the requested data is in the cache 16, the host controller 22 may retrieve the data from the cache 16 and forward it to the retrieving host node 124 via the adapter 26 and the respective one of the links 114 to which the retrieving host node 124 is coupled. The retrieving host node may then forward the requested data to the client node 146 that requested it via a respective one of the links 134, network 144 and the link 145 associated with the client node 146.

Additionally, a client node 146 may forward a request to store data to a host node (e.g., host node 124, hereinafter termed "the storing host node") via one of the links 145 associated with the client node 146, network 144 and one of the links 134 associated with the storing host node 124. The storing host node 124 may store the data locally, or alternatively, may request the storing of that data in the system 112 via the respective one of the FC links 114 associated with the storing host node 124.

The data storage request forwarded via the respective one of the FC links 114 associated with the storing host node is initially received by the host adapter 26. The host adapter 26 may then forward the data storage request to the host controller 24 to which it is coupled. In response to the data storage request forwarded to it, the host controller 24 may then initially store the data in cache 16. Thereafter, one of the disk controllers (e.g., controller 18) may cause that data stored in the cache 16 to be stored in one or more of the data storage devices 36 by issuing appropriate commands for same to the devices 36 via the adapter 30.

With particular reference being made to FIGS. 2–7, the construction and operation of illustrative embodiments of the present invention will now be described. System 112 includes a plurality of electrical backplanes, including backplane 200. Backplane 200 includes a first plurality of backplane connection slots 204A . . . 204N, and a second plurality of backplane connection slots 206A . . . 206N. Each of the host adapter cards is configured and dimensioned to permit the host adapter cards to be inserted into and received by respective of the first plurality of backplane connection slots 204A . . . 204N, such that, when the host adapter cards are so inserted into and received by the slots 204A . . . 204N, the host adapter cards become electrically and mechanically coupled to the backplane 200 via the slots 204A . . . 204N. For example, host adapter cards 208, 212 are configured and dimensioned to permit cards 208, 212 to be inserted into and received by slots 204A, 204N, respectively, such that, when the cards 208, 212 are so inserted into and received by the slots 204A, 204N, the cards 208, 212 become electrically and mechanically coupled to the backplane 200 via the slots 204A, 204N. Likewise, each of the host controller cards is configured and dimensioned to permit the host controller cards to be inserted into and received by respective of the second plurality of backplane connection slots 206A . . . 206N, such that, when the host controller cards are so inserted into and received by the slots 206A . . . 206N, the host controller cards become electrically and mechanically coupled to the backplane 200 via the slots 206A . . . 206N. For example, host controller cards 210, 214 are configured and dimensioned to permit the host controller cards 210, 214 to be inserted into and received by slots 206A, 206N, respectively, such that, when the host controller cards 210, 214 are so inserted into and received by the slots 206A, 206N, respectively, the cards 210, 214 become electrically and mechanically coupled to the backplane 200 via the slots 206A, 206N.

Backplane 200 includes a plurality of internal electrical connections (not shown). These internal connections are configured such that, when the host controller and host adapter cards are properly inserted into and received by appropriate respective backplane connection slots, each host controller becomes electrically coupled to the respective host adapter with which it is associated. For example, when host controller cards 210, 214 are so inserted into and received by slots 206A, 206N, respectively, and host adapter cards 208, 212 are so inserted into and received by slots 204A, 204N, respectively, host controller 24 becomes electrically coupled via the backplane's internal electrical connections to its associated host adapter 26, and host controller 22 becomes electrically coupled via these connections to its associated host adapter 28.

Each of the host controllers in system 112 may include two respective processing sections. Each of the processing sections in each respective controller may control and monitor the operation of, and exchange I/O data with circuitry comprised in respective processing domains or sections in the respective network adapter with which the respective controller is associated. For example, with reference being made to FIG. 3, controller 22 may include two respective processing sections 260 and 262, and similarly, controller 24 may include two respective processing sections 260 and 262. Depending upon the particular configuration of the controllers 22, 24, however, each of the controllers 22, 24 may instead comprise four such processing sections, if the adapters 26, 28 with which they are associated are appropriately configured to be interfaced and exchange data with, and be controlled by such differently configured controllers 22, 24. As will be described below, each of the processing sections 260, 262 in controller 22 may control and monitor the operation of, and receive from and transmit I/O data to, a respective processing domain or section in adapter 28, and each of the processing sections 260, 262 in controller 24 may control and monitor the operation of, and receive from and transmit I/O data to, a respective processing domain or section in adapter 26. Each of the processing sections 260, 262 in each of the host controllers 22, 24 may comprise a respective PowerPC™ microprocessor of the type manufactured by and commercially available from Motorola, Inc. of Austin, Tex., United States of America, interrupt control and processing logic, computer-readable memory, and associated logic and related circuitry. In general, the respective computer-readable memory comprised in the respective processing sections 260, 262 in the host controllers 22, 24 store software programs and data structures associated with, and for carrying out the inventive and other functions, methods, techniques, and operations described herein as being carried out by the respective processing sections; the respective processing sections are configured to execute these software programs and manipulate these data structures, and the execution of the software programs by the respective processing sections may cause and facilitate the inventive and other functions, methods, techniques, and operations described herein as being carried out by the respective processing sections so as to implement this embodiment of the present invention. It will be apparent to those skilled in the art that many types of microprocessors and memories may be used according to the within teachings to implement this embodiment of the present invention.

Figure 4:
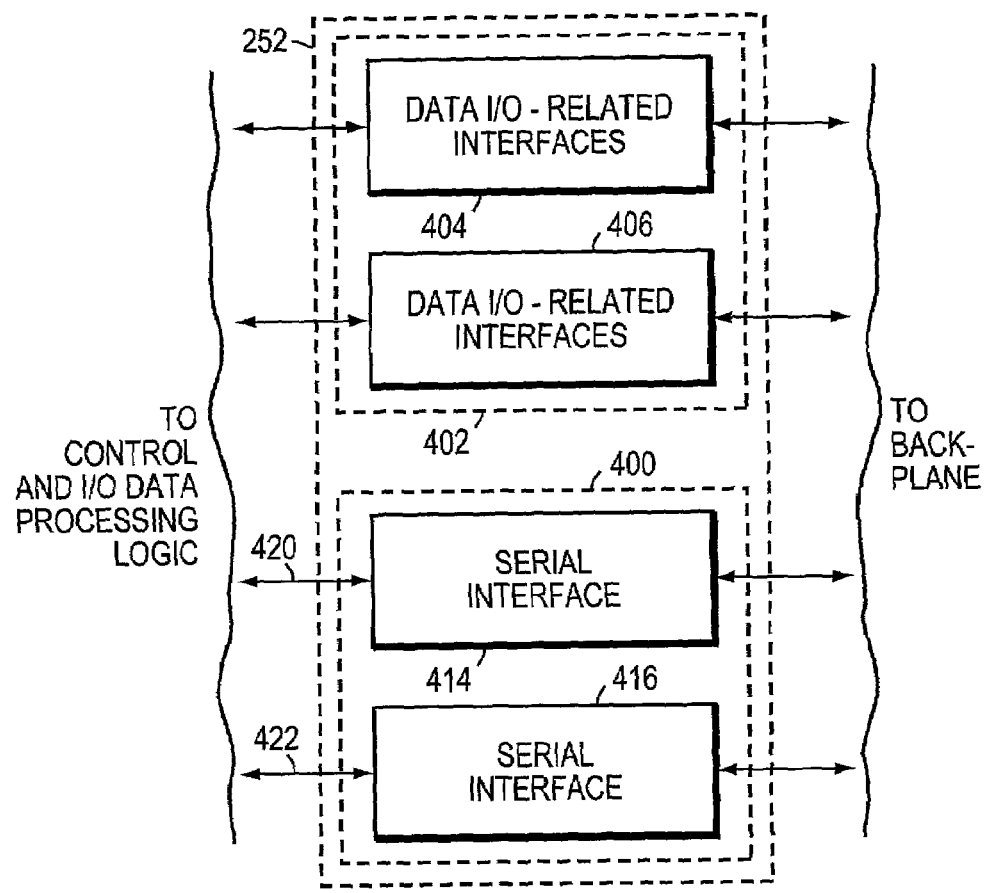
FIG. 4 is high-level functional block diagram illustrating one or more backplane interfaces that may be comprised in a network adapter made according to one embodiment of the present invention.

With particular reference being made to FIG. 4, the construction and operation of the backplane interfaces 252 of adapter card 208 will now be described. Except as expressly stated to the contrary herein, each of the host adapters 26 . . . 28 in the system 112 has an identical respective construction and operation. When the electrical circuit card 208 is properly inserted into and received by the slot 204A, backplane interfaces 252 of the network adapter card 208 become electrically and mechanically coupled to the backplane 200. The interfaces 252 in adapter card 208 comprise adapter control and management interfaces 400 and data I/O interfaces 402. In adapter card 208, the data I/O interfaces 402 comprise two respective sets or groups of FC I/O interfaces 404, 406. When the interfaces 252 become coupled to the backplane 200, the I/O interfaces 402 become coupled via the backplane's internal electrical connections to the host controller 24 with which the adapter 26 is associated, and the interfaces 400 become electrically coupled via the connections to the controller 24.

The data I/O interfaces 400 in adapter 26 permit the transmission, from the controller 24 to the adapter 26, of data that is to be transmitted from the adapter 26 to one or more of the host nodes 124 and also permits the transmission of data received by the adapter 26 from one or more of the host nodes 124 to be transmitted to the controller 24. Each of the sets of interfaces 404, 406 in adapter 26 may comprise four respective FC I/O interfaces. However, depending upon the particular type of network adapter, the number and type of I/O interfaces comprised in the sets 404, 406 may vary. For example, as stated above, adapter 28 may be a different type of network adapter from adapter 26, and may be configured to facilitate FC communication among the controller 22 and four host nodes, while adapter 26 may be configured to facilitate FC communication among the controller 24 and eight host nodes. If adapter 28 is so configured, then each of the sets of data I/O interfaces 404, 406 included in the backplane interfaces 252 of adapter 28 may comprise two respective FC I/O interfaces.

In accordance with this embodiment of the present invention, the construction and operation of the respective command/control interfaces 400 in each of the adapter cards are identical, and comprise two respective serial control interfaces 414 and 416. That is, in accordance with this embodiment of the present invention, regardless of the particular respective types/configurations of the network adapters 26 . . . 28 in system 112, each of these network adapters 26 . . . 28 comprises identical respective command interfaces 400, which respective command interfaces 400 comprise two respective serial command interfaces 414 and 416. Each of these respective serial command interfaces 414, 416 has an identical respective construction and operation, which will be described below.

Although not expressly shown in the Figures, the interfaces 400 in adapter 26 may permit the processing sections 260, 262 in controller 24 to receive various output signals from, and to supply various input signals to the respective processing sections in the adapter 26, other than via the command interfaces 414, 416. These output signals may comprise, among other signals, respective interrupt request signals for requesting initiation by the processing sections 260, 262 in the controller 24 of one or more interrupt service routines, and these input signals may comprise, among other signals, respective hardware reset signals for causing resetting and re-initialization of the hardware circuitry in the respective processing sections in the adapter 26, and signals that may indicate the respective numbers of data I/O interfaces comprised in the sets 402, 404.

Figure 5:
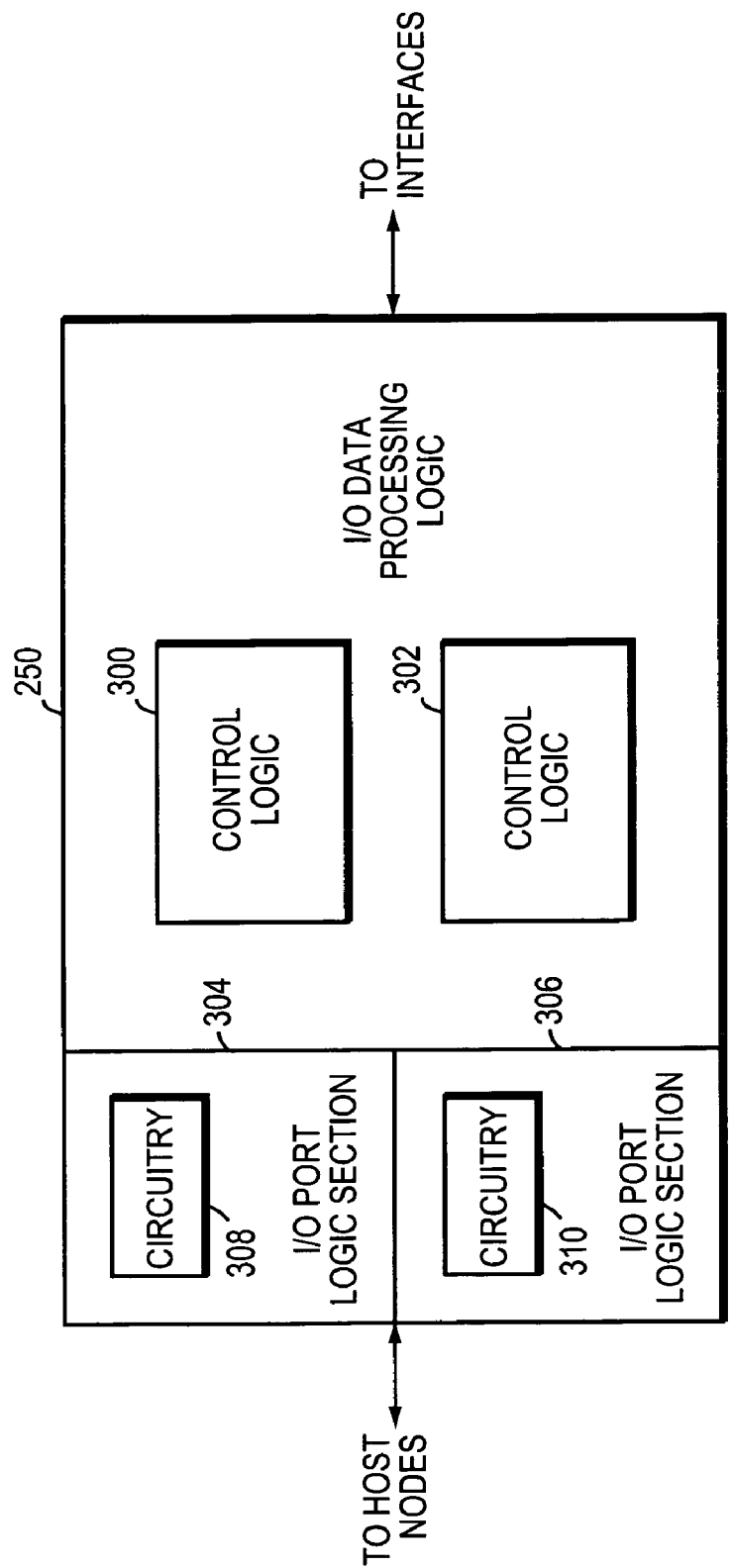
FIG. 5 is a high-level block diagram illustrating functional components of control and I/O data processing logic comprised in a network adapter made according to one embodiment of the present invention.
Figure 6:
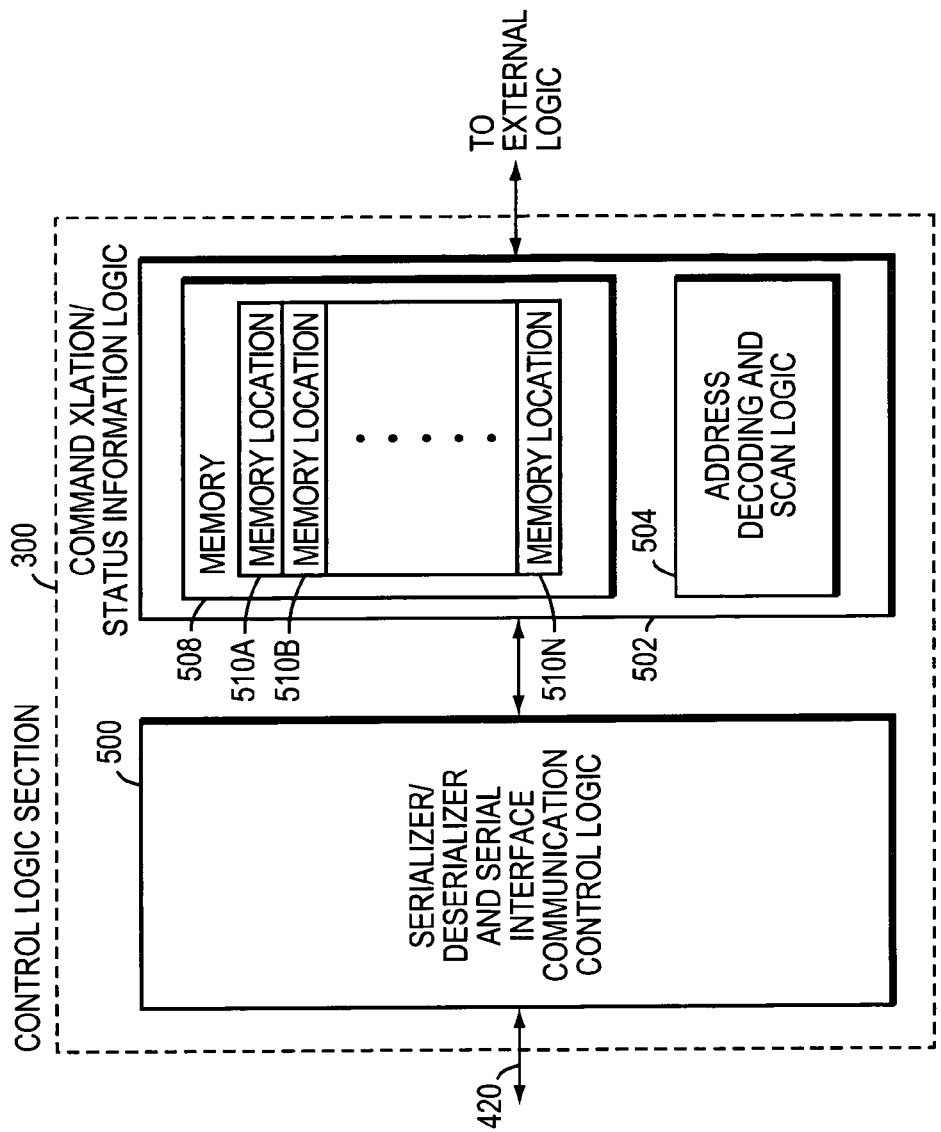
FIG. 6 is a high-level block diagram illustrating functional components of a control logic section comprised in the control and I/O data processing logic illustrated in FIG. 5.

FIG. 5 is a high-level schematic block diagram illustrating functional components of control and I/O data processing logic 250 comprised in network adapter 26. Logic 250 is coupled to the interfaces 252. Logic 250 comprises at least one, and in this embodiment, two external I/O port logic sections 304 and 306; logic 250 also comprises at least one, and in this embodiment, two control logic sections 300 and 302. External I/O port logic section 304 is associated with and controlled by control logic section 300; external I/O port logic section 306 is associated with and controlled by control logic section 302.

The logic sections 304, 306 comprise I/O ports and related circuitry necessary to permit the sections 304, 306 to exchange data and commands with the host nodes to which the network adapter that comprises the sections 304, 306 is coupled. For example, each of the logic sections 304, 306 in adapter 26 may comprise four respective FC I/O optical transceiver ports and respective related circuitry (e.g., respective electro-optical connector/converter circuitry, FC communication retimer circuitry 308, 310, etc.) such that adapter 26 may be able to exchange data commands with the host nodes 124 via FC links 114.

Adapter 26 includes two processing sections. One of the two processing sections in adapter 26 includes the control logic section 300 and the port logic section 304, and is controlled by the processing section 262 in controller 24; the other of the two processing sections in adapter 26 includes the control logic section 302 and the port logic section 306, and is controlled by the processing section 260 in controller 24.

Figure 7:
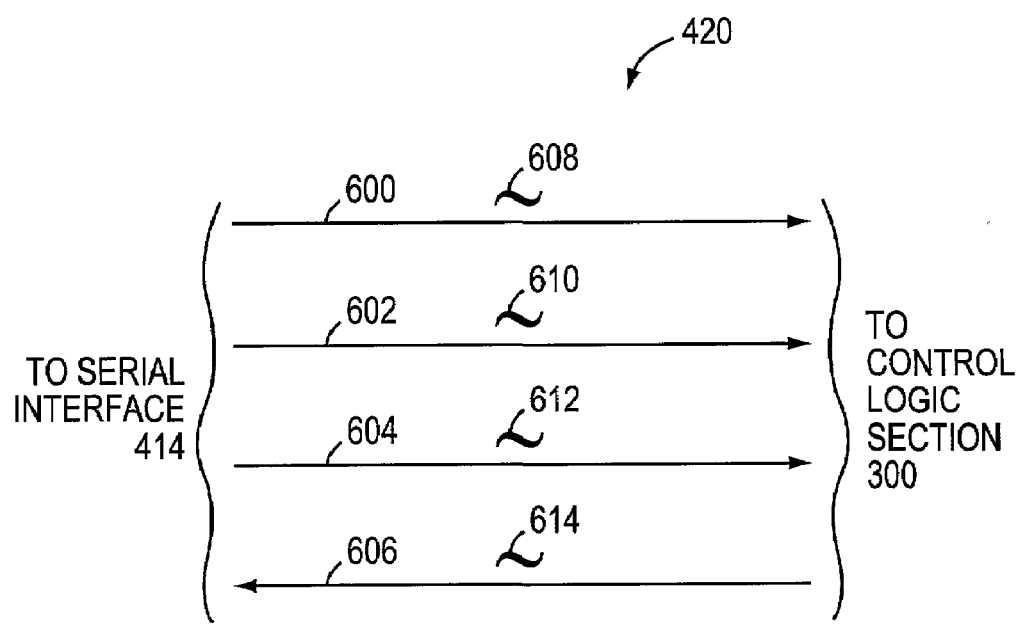
FIG. 7 is a diagram for facilitating description of the construction and operation of a serial bus that may be used to couple a serial command backplane interface in a network adapter made according to one embodiment of the present invention to an associated control logic section in said network adapter.

With particular to FIGS. 4, 5, and 7, in adapter 26, control interface 414 is coupled to the control logic section 300 via a first serial control bus 420, and control interface 416 is coupled to the control logic section 302 via a second serial control bus 422. Each of the serial busses 420, 422 comprises four respective electrical connections. For example, control bus 420 comprises electrical connections 600, 602, 604, and 606. As will be described in greater detail below, during the operation of the bus 420, electrical signals 608, 610, 612, and 614 may propagate through connections 600, 602, 604, and 606, respectively.

In adapter 26, the respective construction and operation of bus 420 are identical to the respective construction and operation of bus 422, the respective construction and operation of the control logic section 300 are identical to the respective construction and operation of the control logic section 302, and the respective construction and operation of the port logic section 304 are identical to the respective construction and operation of the port logic section 306.

Control logic section 300 in adapter 26 comprises serial bus communication and interface logic 500 and command translation and status information logic 502. Circuitry 500 is coupled both to the serial bus 420 and to the logic 502. As is described more fully below, the processing section 262 in controller 24 may issue commands to the control logic section 300 in adapter 26 in the form of respective serial bit streams that may be transmitted from the controller 24, via the command interface 414 and serial bus 420, to the control logic section 300. When one of these serial bit stream is so transmitted to the logic 300, the circuitry 500 may receive and convert the stream into a corresponding parallel command word (hereinafter termed "command word"), and may supply the command word to the logic 502. Additionally, the logic 502 may transmit to the circuitry 500 parallel status information words (hereinafter, "status words"), whose purpose is described below. When the circuitry 500 receives one of these status words from the logic 502, the circuitry 500 may convert the received status word into a corresponding serial bit stream, and may transmit the corresponding serial bit stream, via the serial bus 420 and the serial interface 420, to the processing section 262 of controller 24. Depending upon the particular configuration of the adapter 26, each command word may be either 8 or 11 bits in length. The respective lengths of individual status words may vary depending upon the particular status information being indicated by the status word.

As stated previously, serial command bus 420 comprises four transmission lines or connections 600, 602, 604, and 606. These connections 600, 602, 604, and 606 may be used to propagate respective signals 608, 610, 612, and 614 to implement a communication protocol that may facilitate exchange of serial bit streams between the processing section 262 in controller 24 and the logic section 300 in adapter 26 that may embody command and status words.

The signals 608, 610, and 612 propagating through lines 600, 602, and 604 are driven by the processing section 262 of the controller 24, and the signal 614 propagating through line 606 is driven by the logic 500 in section 300 in adapter 26. Logic 500 in section 300 in adapter 26 includes a command shift register (not shown, hereinafter termed "CSR") having a size that matches the expected command word length. In adapter 26, command words that are written into the CSR are supplied by the logic 500 to the logic 502 in section 300. By appropriately driving the respective logic states of the signals 608, 610, and 612, the processing section 262 in controller 24 may cause a command word to be written into the CSR by the logic 500 in section 300 in adapter 26.

More specifically, the processing section 262 in the controller 24 may initiate the writing of a command word into the CSR by driving the signal 608 to a low logic state. When the signal 608 is driven to the low logic state, the logic 500 in section 300 in adapter 26 becomes configured to write into the CSR, as successively increasing order bit values of the command word, starting with the LSB of the command word, the respective logic states of the signal 610 that occur at successive low-to-high transitions in the logic state of the signal 612. Thus, for example, in order to cause the logic 500 in section 300 in adapter 26 to write the LSB of the command word into the CSR, the processing section 262 in controller 24 first drives the logic state of the signal 610 so as to correspond to the logic state of the lowest significant bit (LSB) of the command word to be written into the CSR, and thereafter, drives the logic state of the signal 612 first to a low logic state and then to a high logic state. The processing section 262 in controller 24 may then use the above procedure to cause the remaining (i.e., higher order) bits of the command word to be written into the CSR. During the entire time period when the bits of the command word are being written into the CSR, the processing section 262 in controller 24 causes the signal 608 to remain in a low logic state. After all of the bits of the command word have been written into the CSR, the processing section 262 in controller 24 may cause, in section 300 in adapter 26, the logic 500 to transmit to and load into the logic 502 the command word written in the CSR, by performing the following operations, in the recited sequence: toggling the logic state of the signal 608 from a low logic state to a high logic state, driving the signal 610 to a low logic state, driving the signal 612 to a low logic state, and driving the signal 612 to a high logic state.

Logic 502 in section 300 in adapter 26 includes computer-readable memory 508 and address decoding and scan logic 504. In the section 300 in adapter 26, memory 508 comprises a plurality of memory locations 510A, 510B, . . . 510N (e.g., which may comprise or constitute respective registers) that may store respective predetermined executable command words and status words; the address decoding and scan logic 504 in section 300 in adapter 26 is configured to associate respective valid command words that may be transmitted to and loaded into logic 502 from logic 500, with the addresses of the memory locations 510A, 510B, . . . 510N that may contain respective executable command words that may correspond to, or status words requested by, these respective valid command words. These addresses may be specified by or comprised in respective portions or fields in the command words themselves. After the command word transmitted from the CSR has been loaded into the command translation and status information logic 502 in section 300 in adapter 26, the address decoding and scan logic 504 in that logic 502 may examine that command word and may determine based thereon the address of the memory location in memory 508 that may contain the executable command word corresponding to, or the status word requested by, the command word loaded into the logic 502 from the logic 500.

If the command word loaded into the logic 502 from the logic 500 in section 300 in adapter 26 corresponds to an executable command word stored in the memory 508 in logic 502, then the logic 504 may cause the logic 502 to retrieve that executable command word from the memory location (e.g., memory location 510A) in memory 508 in which that executable command word is stored, and to forward that executable command word to what is hereinafter termed an "external logic section" (i.e., predetermined circuitry in adapter 26 that is external to the control logic section 300 and that may execute one or more of such executable command words, e.g., the port logic section 304, or a portion thereof, such as, retimer 308, and/or other components or circuitry in the adapter 26) associated with the executable command word; after such an external logic section receives the executable command, the external logic section may execute the executable command word, and the execution of same by the external logic section may cause the external logic section to carry out the operation whose execution was commanded by the corresponding command word loaded into the CSR by the processing section 262 in controller 24.

Predetermined circuitry in adapter 26, including the external logic section, may provide respective sets of status-related signals to the logic 502 in section 300 in adapter 26 that may indicate the respective operational statuses of such circuitry. The logic 502 in section 300 in adapter 26 may generate and store in respective memory locations (e.g., in memory location 510N in the case of the external logic section) in memory 508 status words, based upon such status-related signals, that may indicate the operational statuses of such circuitry. In order to determine the operational statuses of such circuitry in adapter 26, processing section 262 in controller 24 may issue, in accordance with the command issuance procedure described above, status word read commands (hereinafter termed "status read commands"), which are special types of command words to the control logic section 300 in adapter 26, via the serial interface 414 and bus 420, that may request that the operational statuses of such circuitry be indicated to the processing section 262 in controller 24.

For example, in order to determine the operation status of an external logic section, the processing section 262 in controller 24 may issue to the control logic section 300 in adapter 26 a status read command that may request that the operational status of the external logic section be indicated to the processing section 262 in the controller 24. After such a status read command has been loaded into the logic 502 in section 300 in adapter 26, the logic 504 in section 300 in adapter 26 may cause this status read command to be executed by the section 300, which execution may cause the logic 502 to supply to the logic 500 the status word (hereinafter termed "the external logic section status word") stored in the memory location 510N, and thereafter, by appropriately controlling the respective logic states of the signals 608, 610, and 612 propagating through bus 420, the processing section 262 in controller 24 may cause the external logic section status word to be read out from the logic 500 as a serial bit stream from which the processing section 262 in controller 24 may reconstruct the external logic section status word.

More specifically, immediately after the section 300 in adapter 26 has executed the status read command, the logic 500 in section 300 causes the logic state of the signal 614 propagating through the line 606 in bus 420 to correspond to the logic state of the value of the LSB of the external logic section status word. After this has occurred, the processing section 262 in controller 24 may examine (via the interface 414) the logic state of the signal 614 to determine, and may store in a memory location internal to the controller 24, as the LSB of the external logic section status word, the bit value that corresponds to the logic state of the signal 614. The processing section 262 in controller 24 may be pre-programmed with a data table (not shown) that may correlate respective status read commands with the respective sizes (i.e., in bits) of the status words that may be transmitted from the section 300 in adapter 26 in response to execution of such status read commands by the section 300. Based upon the information contained in this data table, the processing section 262 in controller 24 may determine the number of bits comprised in the external logic section status word.

If the number of bits comprised in the external logic section status word is greater than unity, the processing section 262 in controller 24 may command the logic 500 in section 300 in adapter 26 to transmit serially the next lowest order bit (i.e., next to the LSB) of the external logic section status word via the line 606, by executing the following operations in the recited sequence: driving the signal 608 propagating through line 600 to a high logic state, driving the signal 610 propagating through line 602 to a high logic state, and driving the signal 612 propagating through line 604 first to a low logic state and then to a high logic state. When these operations are performed in the recited sequence, this causes the logic 500 in section 300 in adapter 26 to drive the logic state of the signal 614 propagating through line 606 so as to correspond to the logic state represented by the value of the bit in the external logic section status word that is next lowest in order to that of the external logic section status word's LSB; the processing section 262 in controller 24 may examine (via the interface 414) the logic state of the signal 614 to determine, and may store in a memory location internal to the controller 24, as the bit in the external logic section status word that has the next lowest order compared to the LSB of the external logic section status word, a bit value that corresponds to the logic state of the signal 614. Thereafter, in order to read each respective bit of the external logic section status word that has yet to be stored in the controller 24 (hereinafter termed "the remaining bits of the external logic section status word"), the processing section 262 in the controller 24 may successively, respectively toggle the logic state of the signal 612 from a low logic state to a high logic state, while maintaining in high logic states the signals 608 and 610; when this occurs, this causes the logic 500 in section 300 in adapter 26 to drive the logic state of the signal 614 such that, during each respective high-to-low logic state transition of the signal 612, the logic state of the signal 614 changes to correspond to the respective logic states represented by the remaining bits, starting with third least significant bit in the remaining bits and continuing therefrom in accordance with the significance order of the remaining bits. During each of these high-to-low logic state transitions of the signal 612, the processing section 262 in controller 24 may examine (via the interface 414) the logic state of the signal 614 to determine the respective bit values represented by the logic state of the signal 614, and may appropriately store these bit values in its internal memory locations in such a way as to reconstruct the external logic section status word. Thereafter, the processing section 262 in controller 24 may examine the external logic section status word to determine the operational status of the external logic section. That is, the processing section 262 in controller 24 may maintain tables that may correlate respective status words that may be received from the adapter 26 to which the controller 24 may be coupled, with the meanings and/or information contents of such status words. The processing section 262 in controller 24 may determine from such tables the operational statuses represented by status words received from the adapter 26.

The command words that may be issued by the processing section 262 in controller 24 may comprise or specify addresses of memory locations in the memory 508 in section 300 in adapter 26 in which are stored respective corresponding executable commands. These executable commands may comprise respective sets of specific control values that, when supplied by the control logic section 300 to specific external logic sections in the adapter 26, may cause such external logic sections receiving such executable commands to perform respective operations. As can be readily appreciated, since different types of network adapters have different hardware and software configurations, the specific configurations of, and operations that may be performed by such external logic sections in different types of network adapters, as well as the type and natures of such external logic section themselves, may vary. Therefore, the specific control values stored in memory 508 may vary depending upon the specific type of the network adapter in which the memory 508 is located. In accordance with this embodiment of the present invention, these different types of network adapters may be associated with respective sets of command words that may be issued by processing sections in the controllers and validly processed by such adapters (i.e., to properly execute executable commands in the manner described above), and the processing sections in the controllers may be pre-programmed with these sets of commands words. The processing sections in each respective controller may be configured to select valid command words to issue to the respective control logic sections in the network adapter with which the respective controller is associated (i.e., command words from one or more sets of command words that may be validly issued to and processed by the respective control logic sections in the network adapter with which the given controller is associated), based upon respective network adapter control logic section type code information (hereinafter termed "type code information") identifying the particular type of network adapter control logic section (and therefore, by implication, also identifying the particular type and configuration of network adapter that comprises the control logic section identified by the type code information) in the network adapter with which the given controller is associated. The respective type code information may be forwarded, as a special type of status word, to the processing sections in the given controller from the network adapter control logic sections in the network adapter with which the given controller is associated, using the respective serial busses and serial command interfaces that are coupled to the respective control logic sections, in response to special status read commands issued to the respective control logic sections from the respective processing sections in the given controller.

For example, in system 112, the control logic sections in the network adapters 26 and 28 each may be associated with respective type code information that may be supplied, in the manner described above, to respective processing sections in the controllers 24 and 22 with which adapters 26 and 28 are associated. Also, if system 112 comprises other types of network adapters, e.g., that may exhibit hub-like, switch-like, or server-like functionalities/operational capabilities, such as those of the network adapters disclosed in e.g., co-pending U.S. patent application Ser. No. 09/796,168, filed Feb. 28, 2001, entitled "Storage System Adapter and Method of Using Same," co-pending U.S. patent application Ser. No. 09/852,580, filed May 10, 2001, entitled "Data Storage System With Improved Network Interface," co-pending U.S. patent application Ser. No. 09/950,165, filed Sep. 10, 2001, entitled "Data Storage System With One Or More Integrated Server-like Behaviors," and co-pending U.S. patent application Ser. No. 09/877,810, filed Jun. 7, 2001, entitled "Data Storage System With Integrated Switching," then each of these other types of network adapters may be appropriated modified to practice this embodiment of the present invention and may be identified by respective type code information in the manner described above. Additionally, if system 112 comprises disk adapters of the type that may be used with and coupled to port bypass circuitry of the type disclosed in co-pending U.S. patent application Ser. No. 09/877,848, filed Jun. 7, 2001, entitled "Configurable Fibre Channel Loop System," co-pending U.S. patent application Ser. No. 09/877,808, filed Jun. 7, 2001, entitled "Mass Storage Device Mounting System," and co-pending U.S. patent application Ser. No. 09/877,869, filed Jun. 7, 2001, entitled "Address Mapping In Mass Storage Device Mounting System," then each of these types of disk adapters comprised in system 112 may be appropriately modified to practice the within teachings of this embodiment of the present invention and may be associated with respective disk adapter control logic section type code information that may be supplied to processing sections in the respective disk controllers with which these disk adapters are associated in system 112. Each of the above-cited co-pending U.S. patent applications is hereby incorporated herein by reference in its entirety.

Among the executable commands that may be stored in the memory 508 in logic section 300 in adapter 26 may be respective executable commands that, when executed by external logic sections in adapter 26, may implement or cause respective changes in the hardware or software operation and/or configuration of adapter 26; for example, such executable commands, when executed, may cause (1) interrupt masking that may prevent the network adapter 26 from supplying, in response to one or more predetermined types of events (e.g., hardware errors, failures of I/O ports comprised in the port logic sections 304 and 306, etc.) that may take place in the adapter 26, an interrupt signal that otherwise would be supplied to the controller 24 in response to same, (2) resetting of the respective internal operating states of one or more components (e.g., one or more of the I/O ports comprised in the port logic sections 304 and 306) in the adapter 26, (3) activation of one or more such components, (4) de-activation of one or more such components, (5) initiation of a diagnostic routine involving one or more such components, clearing of hardware error/attention conditions, and/or (6) control of one or more of the retiming circuitry 308 and 310 for the purpose of selecting the communication speed (e.g., 2.1250 gigahertz, 1.0625 gigahertz, etc.) of one or more such components. Alternatively or in addition thereto, other and/or additional types of executable commands may be executed in the network adapter if the particular type of the network adapter is different from that of network adapter 26. For example, if the network adapter is of the type disclosed in co-pending U.S. patent application Ser. No. 09/796,168, filed Feb. 28, 2001, entitled "Storage System Adapter and Method of Using Same," and said adapter is modified to practice this embodiment of the present invention, then among the executable commands that may be executed in this type of network adapter may be executable commands that may cause the configuration of the configurable node comprised in such adapter to change (i.e., for the purpose of changing the topology of the network comprised in such adapter). Also alternatively or in addition thereto, if the network adapter is of the type disclosed in co-pending U.S. patent application Ser. No. 09/877,848, filed Jun. 7, 2001, entitled "Configurable Fibre Channel Loop System," and said adapter is modified to practice this embodiment of the present invention, then among the executable commands that may be executed in this type of network adapter may be executable commands that may cause the respective bypass statuses of the adapter's I/O ports to change and/or may change whether selection of such bypass statuses is to be made by the adapter or by its associated controller.

Among the types of status words that may be transmitted from an adapter (e.g., adapter 26) made according to this embodiment of the present invention to its associated controller (e.g., controller 24) may be respective status words that may indicate e.g., the number of I/O ports comprised in port logic sections 304 and 306, respective versions of program code being executed by the control logic sections 300 and 302, respective communication speeds supported and/or currently being used by I/O ports in the port logic sections 304 and 306, respective activation/operation statuses of I/O ports in the port logic sections 304 and 306, whether respective signals from the host nodes are being received at respective I/O ports in the port logic sections 304 and 306, presence of hardware errors/attentions in the adapter, etc. Depending upon the particular type of the network adapter made in accordance with the present invention, the network adapter may be able to provide other and/or additional types of status words to its associated controller.

The terms and expressions which have been employed in this application are used as terms of description and not of limitation, and there is no intention, in the use of such terms and expressions, of excluding any equivalents of the features shown and described or portions thereof, but it is recognized that various modifications are possible within the scope of the invention as claimed. For example, although the cache 16, disk controllers 18 . . . 20, and host controllers 22 . . . 24 have been described as being coupled via bus system 14, if system 112 is appropriately modified, the cache 16, disk controllers 18 . . . 20, and host controllers 22 . . . 24 may be coupled together and communicate via a matrix of point-to-point data transfer and messaging systems, e.g., of the type disclosed in co-pending U.S. patent application Ser. No. 09/745,814 entitled, "Data Storage System Having Crossbar Switch With Multi-Staged Routing," filed Dec. 21, 2000; this co-pending application is owned by the Assignee of the subject application, and is hereby incorporated by reference herein in its entirety.

Other modifications are also possible. For example, the control logic section 300 in adapter 26 may be configured to permit the processing section 262 in controller 24 to be able to transmit to the section 300 special types of status read commands that may specify that a plurality of status words stored in the memory 508, starting from a status word specified in the status read command, are to be read out sequentially from the memory 508, as serial bit streams using the bus 420. Additional modifications are also possible. Accordingly, the present invention should be viewed broadly as encompassing all modifications, variations, alternatives and equivalents as may be encompassed by the hereinafter appended claims.

What is claimed is:

1. A network adapter that may be used in a network data storage system to permit data exchange among data exchanging devices and a data storage system input/output (I/O) controller, the controller residing in the data storage system, the data exchanging devices being external to the adapter, the network adapter being one type of adapter selected from a group of different types of adapters that may communicate with the controller, the network adapter comprising:

at least one control interface that may be coupled to the controller, each of the different types of adapters comprising at least one respective interface that is identical to the at least one control interface; and at least one control logic section that may receive from the controller, via the at least one control interface, at least one command, and may transmit to the controller, via the at least one control interface, information concerning operation of the network adapter, the at least one control logic section being configured to access, based upon the at least one command, memory that may contain the information and an executable command to be supplied to other logic in the network adapter;

wherein the executable command, when executed by the network adapters prevents the network adapter from supplying an interrupt signal to the controller in response to at least one type of event that may occur.

2. The network adapter of claim 1, wherein the network data storage system includes an electrical backplane to which the network adapter and the controller may be coupled, the backplane being configured to permit communication between the controller and the network adapter when the network adapter and the controller are coupled to the backplane.

3. The network adapter of claim 1, wherein the data storage system comprises a set of mass storage devices that may exchange data with the data exchanging devices via the network adapter.

4. The network adapter of claim 1, wherein the at least one control interface comprises an asynchronous transmission interface via which the at least one command may be transmitted to the network adapter from the controller as a serial bit stream when the network adapter is coupled to the controller.

5. The network adapter of claim 1, wherein the different types of adapters have different respective configurations, and the information indicates one of the following: the respective configuration of the network adapter, a number of I/O ports comprised in the network adapter, a version of program code executed by the at least one control logic section, a communication speed supported by the network adapter, and an operational status of the network adapter.

6. The network adapter of claim 1, wherein the executable command, when executed by the network adapter, causes one of the following operations to occur: resetting of an operating state of one or more components of the network adapter, activation of the one or more components, and de-activation of the one or more components.

7. The network adapter of claim 6, wherein the one or more components comprises one or more I/O ports of the network adapter.

8. The network adapter of claim 5, wherein the operational status involves whether a signal from one of the data exchanging devices is being received at an I/O port of the network adapter.

9. The network adapter of claim 1, wherein the executable command, when executed by the network adapter, causes a configuration of the network adapter to be changed.

10. A method of using a network adapter that may be used in a network data storage system to permit data exchange among data exchanging devices and a data storage system input/output (I/O) controller, the controller residing in the data storage system the data exchanging devices being external to the adapter, the network adapter being one type of adapter selected from a group of different types of adapters that may communicate with the controller, the method comprising:

coupling at least one control interface in the network adapter to the controller, each of the different types of adapters comprising at least one respective interface that is identical to the at least one control interface; and receiving at least one control logic section, via the at least one control interface, at least one command from the controller, the at least one control logic section also being configured such that the at least one control logic section may transmit to the controller, via the at least one control interface, information concerning operation of the network adapter, the at least one control logic section being configured to access, based upon the at least one command, memory that may contain the information and an executable command to be supplied to other logic in the network adapter;

wherein the executable command, when executed by the network adapter, prevents the network adapter from supplying an interrupt signal to the controller in response to at least one type of event that may occur.

11. The method of claim 10, wherein the network adapter is coupled to the controller via an electrical backplane in the network data storage system, the backplane being configured to permit communication between the controller and the network adapter when the network adapter and the controller are coupled to the backplane.

12. The method of claim 10, wherein the data storage system comprises a set of mass storage devices that may exchange data with the data exchanging devices via the network adapter.

13. The method of claim 10, wherein the at least one control interface comprises an asynchronous transmission interface via which the at least one command is transmitted to the network adapter from the controller as a serial bit stream when the network adapter is coupled to the controller.

14. The method of claim 10, wherein the different types of adapters have different respective configurations, and the information indicates one of the following: the respective configuration of the network adapter, a number of I/O ports comprised in the network adapter, a version of program code executed by the at least one control logic section, a communication speed supported by the network adapter, and an operational status of the network adapter.

15. The method of claim 10, wherein the executable command, when executed by the network adapter, causes one of the following operations to occur: resetting of an operating state of one or more components of the network adapter, activation of the one or more components, and de-activation of the one or more components.

16. The method of claim 15, wherein the one or more components comprises one or more I/O ports of the network adapter.

17. The method of claim 14, wherein the operational status involves whether a signal from one of the data exchanging devices is being received at an I/O port of the network adapter.

18. The method of claim 10, wherein the executable command, when executed by the network adapter, causes a configuration of the network adapter to be changed.

* * * * *